Figure 1:
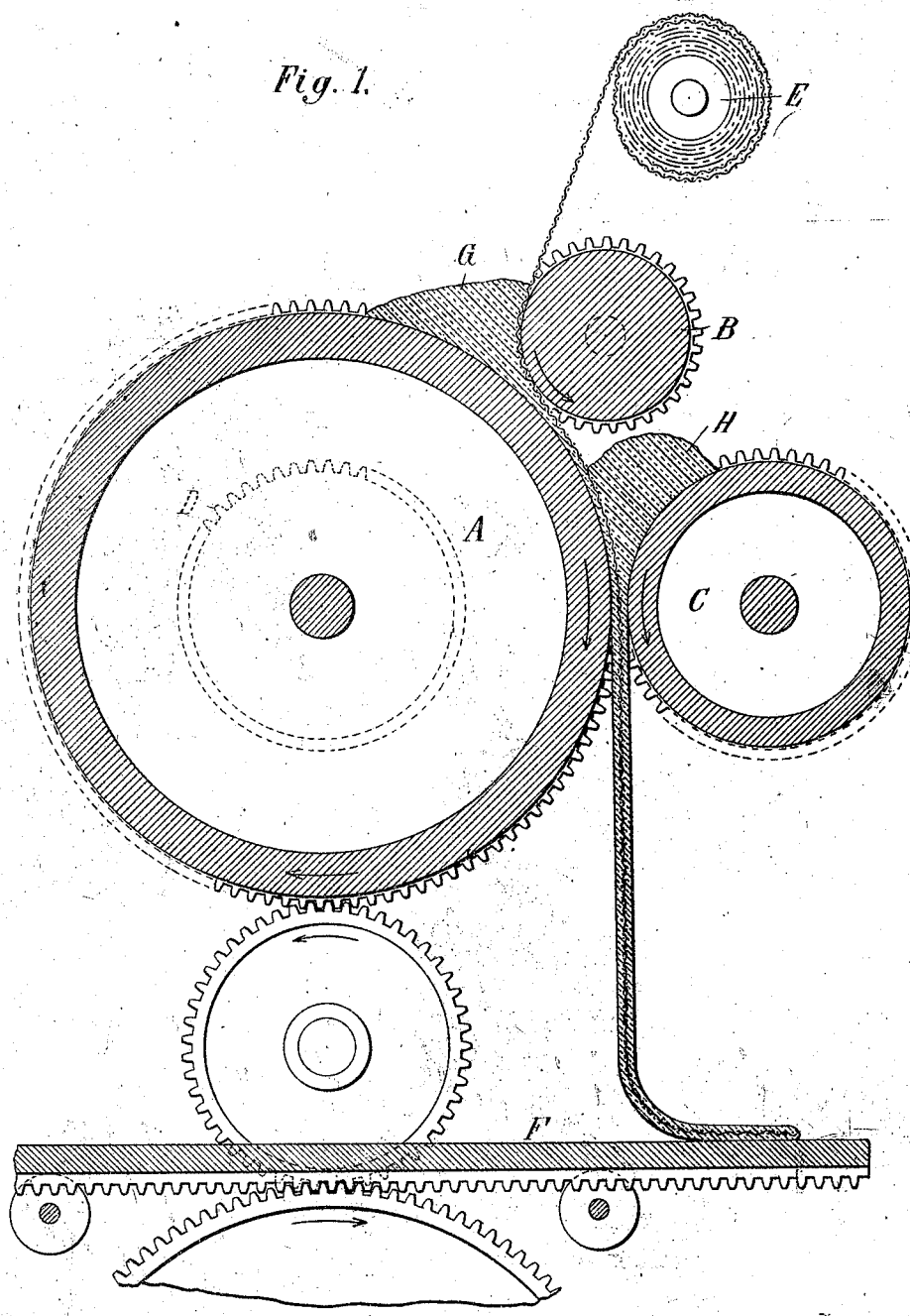

No. 847,637. PATENTED MAR. 19, 1907.
A. J. BALDWIN.
METHOD OF MAKING WIRE GLASS.
APPLICATION FILED JAN. 17, 1905.

2 SHEETS—SHEET 2.

Witnesses
Thomas J. Byrnes
S. S. Dunham

Inventor
Arthur J. Baldwin
By his Attorneys
Kerr, Page & Cooper

UNITED STATES PATENT OFFICE.

ARTHUR J. BALDWIN, OF EAST ORANGE, NEW JERSEY.

METHOD OF MAKING WIRE-GLASS.

No. 847,637.

Specification of Letters Patent.

Patented March 19, 1907.

Application filed January 17, 1905. Serial No. 241,468.

*To all whom it may concern:*

Be it known that I, ARTHUR J. BALDWIN, a citizen of the United States, residing at East Orange, in the county of Essex and State of New Jersey, have invented a certain new and useful Method of Making Wire-Glass, of which the following is a specification, reference being had to the drawing accompanying and forming part of the same.

My invention relates to the manufacture of the product known as "wire-glass"—that is, a sheet of glass having embedded therein a meshed fabric of wire. Various methods and apparatus have been devised for producing such an article, some of which have proved successful in practice.

My present invention provides a method of making wire-glass in a very simple manner, while at the same time yielding a product which is unsurpassed in quality, particularly as regards homogeneity.

My method also is rapid and may be carried out by apparatus of the simplest character.

In practicing my invention I form a sheet or layer of glass from molten or plastic mass of the same, preferably by means of a pair of rollers, between which the layer is formed. Simultaneously with the formation of the layer I apply to one surface thereof a meshed fabric of wire, and as the wire-bearing layer issues from between the rolls it is disposed in juxtaposition to a rolling-table, with the wired surface presented to the rolling-table at a fixed distance therefrom. I then deposit a mass of molten or plastic glass upon the rolling-table and cause the mass to be formed into a layer against the wire-bearing surface of the first layer. This last-mentioned step is preferably performed by advancing the rolling-table in the direction of the movement of the wire-carrying layer as the latter issues from the devices which form it. After the formation of the second layer is begun the different operations go on simultaneously and may go on continuously, thus producing a wire-glass sheet of any desired length.

My method may be carried out by a variety of apparatus; but in the accompanying drawings I have shown only two forms.

Figure 2:
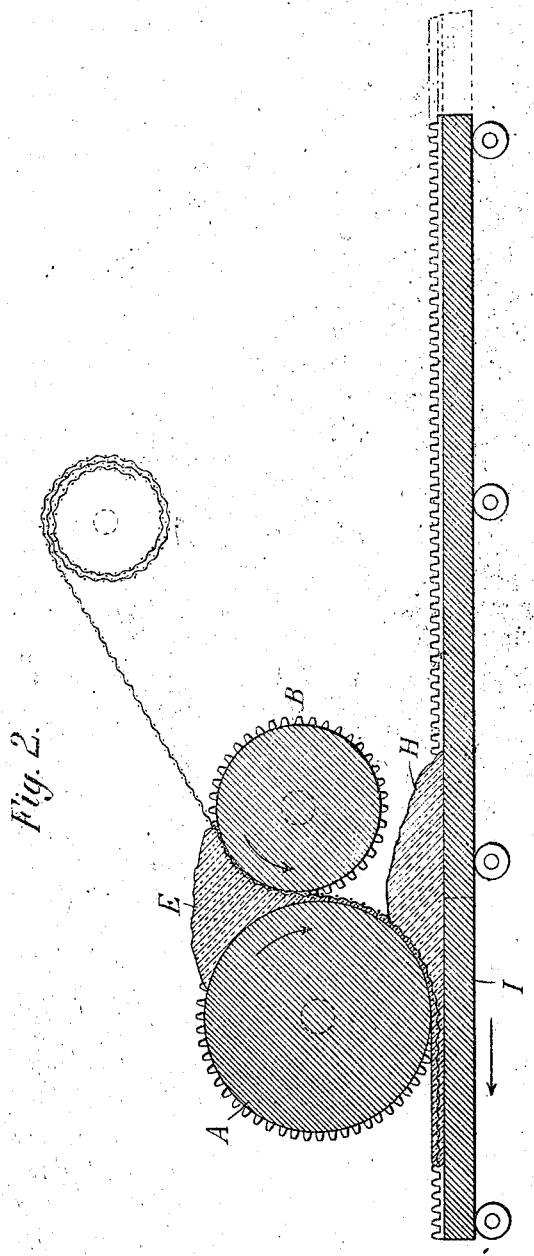

Figure 1 shows an apparatus in which the rolling-table upon which the second layer of glass is formed and applied to the wired surface of the first is in the form of a rotating cylinder. Fig. 2 shows an apparatus in which the rolling-table is in the form of a plane surface.

Referring now to Fig. 1, A is a roll preferably of large diameter, and B a smaller roll arranged to coöperate therewith at the same peripheral speed. Over the latter and usually in contact therewith is passed a strip of wire-meshed fabric drawn from any suitable supply, as the reel E. Between the rolls A B is deposited a batch of molten or plastic glass G. As the rolls revolve this glass is formed into a sheet or layer, with the wire fabric on one surface thereof.

Below the roll B is the rolling-surface, in the present instance a cylindrical surface C, arranged to coöperate with the roll A, but separated therefrom a distance equal to the desired thickness of the finished sheet of wire-glass. The rolling surface or table is revolved by any suitable means and preferably with the same peripheral speed as the rolls A B. As the wired layer descends from the roll B it is met by a molten or plastic mass of glass H, deposited upon the rolling-table C. The descending layer and the revolving table form the glass H into a second layer and simultaneously apply it to the first on the wired surface thereof, and at the same time the pressure exerted by the roll A through the first layer and by the table C through the second layer unites the two into a single homogeneous sheet, leaving the wire fabric embedded therein. The homogeneity of the finished product is especially favored by the mass of hot glass H, resting against the wired surface of the first layer. The batch H banks up, as shown, covering the first layer for some distance above the point at which the second layer is formed and pressed upon the first and effectually prevents the formation of a "skin" thereon, as might occur if the wired surface were exposed to the air. In such case the surface might be chilled, resulting in the formation of the skin mentioned. Such a skin would interfere more of less, depending upon its toughness, with the proper welding or coalescing of the two layers; but in my process the first layer passes between the roll A and the table C without such a skin and the two layers therefore unite readily.

If for any reason the temperature of the roll B should be low enough to chill the surface of the first layer, the heat of the molten mass H will bring the same to the proper degree of plasticity before it arrives between the roll A and the table C. As the finished sheet descends it may be received by any suitable support—as, for example, a plane table F moving at the same speed as the roll A.

The above apparatus will carry out my method in a satisfactory manner, but I prefer to employ the simple mechanism shown in Fig. 2. Here the first layer is formed with the wire fabric applied to one surface between two rolls A and B, as in the former case. The rolling surface, however, is plane, in the form of a bed or table I, arranged adjacent to the roll A, but at a distance therefrom equal to the desired thickness of the finished sheet and is moved (in the direction of the arrow) preferably with the same speed as the peripheral speed of the rolls A B. The mass of plastic glass H deposited on the table is carried thereby up against the descending wire-layer and as the roll B and table I continue to move the mass H is gradually drawn out into a sheet and simultaneously applied to the wired surface of the previous layer. The mass of hot metal H protects the wired layer from chilling and the wire itself from oxidation, as in the former case. The two layers are united into a single homogeneous sheet by the pressure of the roll and table.

The two machines herein shown are described and claimed, broadly, in my copending applications, Serial Nos. 229,056 and 234,980, respectively.

What I claim is—

1. The herein-described method of making wire-glass, which consists in forming a sheet of glass and simultaneously applying a wire fabric upon one side of the same; disposing the sheet, as it is formed, in juxtaposition to a rolling-surface, with the wired side of the sheet next to and spaced from said rolling-surface; depositing an unrolled mass of plastic glass upon the rolling-surface and against the wired surface of the said sheet; and simultaneously rolling the sheet first formed and the plastic mass upon the rolling-surface, whereby a homogeneous sheet of glass is formed with the wire fabric embedded therein; as set forth.

2. The herein-described method of making wire-glass, which consists in disposing a preliminary sheet of glass having a wire fabric on one side of the same, in juxtaposition to a rolling-surface with the wired surface of the said sheet next to but spaced from the rolling-surface, depositing on the rolling-surface, against the wired surface of the said sheet, a mass of plastic glass, and simultaneously rolling the said sheet and plastic mass upon the rolling-surface, whereby a homogeneous sheet of glass is formed with the wire fabric embedded therein, as set forth.

ARTHUR J. BALDWIN.

Witnesses:
  EDWARD T. MAYOFFIN,
  S. S. DUNHAM.